(12) United States Patent
Chen et al.

(10) Patent No.: US 11,024,859 B2
(45) Date of Patent: Jun. 1, 2021

(54) HIGH TEMPERATURE HUMIDIFICATION MEMBRANES

(71) Applicant: Board of Regents, The University of Texas System, Austin, TX (US)

(72) Inventors: Dongmei Chen, Austin, TX (US); Wei Li, Austin, TX (US); Russell Borduin, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 600 days.

(21) Appl. No.: 15/424,125

(22) Filed: Feb. 3, 2017

(65) Prior Publication Data

US 2017/0229720 A1    Aug. 10, 2017

Related U.S. Application Data

(60) Provisional application No. 62/291,130, filed on Feb. 4, 2016.

(51) Int. Cl.
*B01D 71/68* (2006.01)
*B01D 71/02* (2006.01)
(Continued)

(52) U.S. Cl.
CPC .... *H01M 8/04149* (2013.01); *B01D 67/0079* (2013.01); *B01D 71/028* (2013.01); *B01D 71/68* (2013.01); *B29B 11/10* (2013.01); *B01D 69/148* (2013.01); *B29C 44/3453* (2013.01); *B29C 48/08* (2019.02); *B29C 67/202* (2013.01); *B29K 2069/00* (2013.01); *B29K 2071/00* (2013.01);
(Continued)

(58) Field of Classification Search
None
See application file for complete search history.

(56) References Cited

U.S. PATENT DOCUMENTS

| 3,266,973 A | 8/1966 | Crowley et al. |
| 4,012,206 A | 3/1977 | Macriss et al. |

(Continued)

FOREIGN PATENT DOCUMENTS

WO    WO-2016149244 A1 *    9/2016    ............. B32B 5/022

OTHER PUBLICATIONS

Min et al., Zeolites: Synthesis, Characterization, & Practice 13 (2017) (Year: 2017).*

(Continued)

*Primary Examiner* — Krishnan S Menon
*Assistant Examiner* — Brad Gordon
(74) *Attorney, Agent, or Firm* — Meunier Carlin & Curfman LLC (57) ABSTRACT

Membranes and methods of making and using the membranes are described herein. The membranes can include a foamed polymeric support and a plurality of inorganic particles disposed within the foamed polymeric support. The foamed polymeric support can contain a hydrophilic polymer such as polyethersulfone. The plurality of inorganic particles can include hydrophilic particles such as zeolite particles. In certain embodiments, the membrane can be used in humidifiers, such as those used in fuel cell systems. In some aspects, the membrane can be used for separating a fluid mixture comprising water. The membranes described herein are stable for high temperature applications.

18 Claims, 4 Drawing Sheets

(51) Int. Cl.
  *B01D 67/00* (2006.01)
  *B01D 69/14* (2006.01)
  *H01M 8/04119* (2016.01)
  *B29B 11/10* (2006.01)
  *B29K 81/00* (2006.01)
  *B29L 31/00* (2006.01)
  *B29L 31/34* (2006.01)
  *B29K 105/16* (2006.01)
  *H01M 8/1018* (2016.01)
  *B29K 503/04* (2006.01)
  *B29K 75/00* (2006.01)
  *B29K 105/04* (2006.01)
  *B29K 71/00* (2006.01)
  *B29K 69/00* (2006.01)
  *B29K 77/00* (2006.01)
  *B29C 67/20* (2006.01)
  *B29C 44/34* (2006.01)
  *B29C 48/08* (2019.01)

(52) U.S. Cl.
  CPC ...... *B29K 2075/00* (2013.01); *B29K 2077/00* (2013.01); *B29K 2081/06* (2013.01); *B29K 2105/041* (2013.01); *B29K 2105/16* (2013.01); *B29K 2503/04* (2013.01); *B29K 2995/0063* (2013.01); *B29K 2995/0092* (2013.01); *B29L 2031/3468* (2013.01); *B29L 2031/755* (2013.01); *H01M 2008/1095* (2013.01)

(56) References Cited

U.S. PATENT DOCUMENTS

| | | | |
|---|---|---|---|
| 4,699,892 | A | 10/1987 | Suzuki et al. |
| 4,735,193 | A | 4/1988 | Kulprathipanja et al. |
| 4,740,219 | A | 4/1988 | Kulprathipanja et al. |
| 5,554,286 | A | 9/1996 | Okamoto et al. |
| 5,753,121 | A | 5/1998 | Geus et al. |
| 6,538,050 | B1 | 3/2003 | Weilandt et al. |
| 8,540,800 | B2 | 9/2013 | Moscoso et al. |
| 2007/0164466 | A1* | 7/2007 | Scherzer ............... C08J 9/0066 264/45.9 |
| 2011/0294024 | A1* | 12/2011 | Harbusch .......... H01M 8/04201 429/413 |
| 2013/0075944 | A1* | 3/2013 | Tokiwa ................... B29C 44/08 264/41 |
| 2015/0175936 | A1* | 6/2015 | Kingma ................... C11D 1/42 510/162 |

OTHER PUBLICATIONS

Bowen, et al., "Fundamentals and applications of pervaporation through zeolite membranes", Journal of Membrane Science 245 (1-2), 2004, 1-33.

Cho, et al., "Pervaporative seawater desalination using NaA zeolite membrane: Mechanisms of high water flux and high salt rejection", Journal of Membrane Science vol. 371, Issues 1-2, Apr. 1, 2011, pp. 226-238, 2011, 226-238.

Ciobanu, et al., "Preparation and characterization of polymer—zeolite nanocomposite membranes", Materials Science and Engineering C—Materials for Biological Applications, 27, 2007, 1138-1140.

Kim, et al., "Nanocomposite poly(arylene ether sulfone) reverse osmosis membrane containing functional zeolite nanoparticles for seawater desalination", Journal of Membrane Science vol. 443, 2013, 10-18.

Lind, et al., "Influence of Zeolite Crystal Size on Zeolite-Polyamide Thin Film Nanocomposite Membranes", Langmuir, 2009, 25 (17), 2009, 10139-10145.

Sandstorm, et al., "High flux zeolite X membranes", Journal of Membrane Science vol. 354, Issues 1-2, 2010, 171-177.

Shu, et al., "High-Flux MFI Zeolite Membrane Supported on YSZ Hollow Fiber for Separation of Ethanol/Water", Ind. Eng. Chem. Res. 51, 2012, 12073-12080.

\* cited by examiner

HIGH TEMPERATURE HUMIDIFICATION MEMBRANES

CROSS-REFERENCE TO RELATED APPLICATIONS

This application claims the benefit of U.S. Provisional Application No. 62/291,130, filed Feb. 4, 2016, which is hereby incorporated herein by reference in its entirety.

STATEMENT OF GOVERNMENT SUPPORT

This invention was made with Government Support under Grant No. CMMI1201171 awarded by the National Science Foundation. The Government has certain rights in the invention.

FIELD

This disclosure relates generally to membrane structures, more particularly, to membrane structures for the separation of at least one liquid from a fluid mixture.

BACKGROUND

Maintaining proper membrane humidity is one of the key requirements for the polymer electrolyte membrane (PEM) fuel cell to reach its optimum performance. Both membrane dehydration and flooding will cause poor fuel cell performance, as well as degraded fuel cell life. Since water generation in a PEM fuel cell is a function of current demand, which is affected by the vehicle driving condition, a separate mechanism is required to compensate for the humidity fluctuation of the PEM fuel cell systems.

Numerous PEM fuel cell humidification systems have been studied in the past. The most common ones are nozzle spray, gas bubbling, enthalpy wheel, and membrane humidification. The nozzle spray system involves atomizing coolant water that has left the power production section of the fuel cell and spraying the droplets uniformly onto a cloth or wire mesh for the reactant gases to go through. The method is simple; however, sensitive to temperature variation. If not preheated the amount of water absorbed by the inlet air will be affected by its temperature. As the cold air enters and reaches the operating temperature of the fuel cell stack, the relative humidity (RH) of the air will decrease, causing the fuel cell performance to vary. The gas bubbling method passes reactant gases through bottles of heated water. A considerable pressure drop across the gas bubbling humidifier is inevitable. To compensate for the pressure drop, elevated inlet air pressure is required. Therefore, the gas bubbling technique is usually only suitable for small and low-pressure fuel cells. The enthalpy wheel method was developed, with a rotating ceramic wheel as the medium for both heat and humidity exchange. The inlet air humidification and heating is achieved using the hot and humid exhaust gas from the fuel cell itself. The humidity of the air is controlled by the rotational speed of the wheel, or if needed by controlling the opening of a bypass that determines how much of the exhaust gas is directed toward the enthalpy wheel. While it may reduce the concerns of added weight and parasitic loss, the enthalpy wheel method may cause cross-flows and is less desirable to automakers because of its complexity and potential maintenance cost.

Membrane humidifiers have been widely used for gas humidification. The humidifier consists of a dry gas channel and a water or humid gas channel, separated by a water permeable membrane. While flowing, water vapor penetrates through the membrane from the water/humid gas channel to the dry gas channel due to the relative humidity gradient across the membrane. As a result, the inlet dry gas is humidified. The membrane humidifier can be designed to recycle the energy generated by the fuel cell without using a rotating part. There are no cross-flow concerns between the dry air and water channels. Furthermore, the membrane humidifier does not have the temperature and pressure drop associated with the nozzle spray and gas bubbling systems. Therefore, it is considered the best choice for PEM fuel cell humidity control.

Nafion®, a perfluorosulphonic acid (PFSA) polymer, manufactured by DuPont®, is currently the material of choice for humidification membranes due to its excellent water transport properties. However, the performance of Nafion comes at a high cost. In addition, PFSA polymers lose mechanical and dimensional stabilities at high temperature due to its low glass transition temperature, which restricts the operating temperature of membranes utilizing PFSA to below 80° C. There is a need in the art for high temperature membrane humidifiers. There is also a need to reduce membrane cost by developing an alternative material for membrane humidifiers. The compositions, systems, and methods described herein address these and other needs.

SUMMARY

Membranes and methods of making and using the membranes are described herein. The membrane can include a foamed polymeric support comprising a polymer and a plurality of inorganic particles disposed within the foamed polymeric support. In certain embodiments, the foamed polymeric support can contain a hydrophilic polymer. The polymer can have a glass transition temperature ($T_g$) of at least 90° C. Examples of suitable polymers for use in the membranes can include polyamides, polyamideimides, polyimides, polyetherimides, polypyrrolones, polyesters, sulfone-based polymers, fluorinated polymers, polycarbonates, polyacrylonitriles, polyvinylacetates, polyvinylpyrrolidones, polyacrylamides, polyurethane, polyetherketone, derivatives thereof, copolymers thereof, or blends thereof. In some embodiments, the polymer comprises a sulfone-based polymer. In some examples, the polymer comprises polyethersulfone (PES).

The foamed cells in the foamed polymeric support can have an average diameter (also referred to herein as pore cells size) of about 100 microns or less. For example, the average diameter of the foamed cells can be from about 0.1 micron to about 100 microns, for example, from about 0.3 micron to about 100 microns or from about 1 micron to about 100 microns.

As described herein, the foamed polymeric support includes a plurality of inorganic particles disposed therein. In certain embodiments, the plurality of inorganic particles in the foamed polymeric support can include hydrophilic particles. Suitable examples of inorganic particles include alkaline earth metal oxides, transition metal oxides, lanthanide metal oxides, group IVA metal oxides, transition metals, transition-metal catalysts, metal alloys, silicates, alumino-silicates, clay, or combinations thereof. In some examples, the plurality of inorganic particles can include alumino-silicate particles such as zeolite particles.

The inorganic particles can have an average particle diameter of from about 5 nm to about 5 μm. For example, the inorganic particles can have an average particle diameter of from about 50 nm to about 5 μm or from about 100 nm to about 1 μm. The plurality of inorganic particles can be present in an amount of at least 10 wt %, based on the total weight of the foamed polymeric support and the plurality of inorganic particles. For example, the amount of inorganic particles in the membrane can be greater than about 10 wt %, at least about 20 wt %, from about 10 wt % to about 70 wt %, from about 20 wt % to about 70 wt %, or from about 30 wt % to about 60 wt %, based on the total weight of the foamed polymeric support and the plurality of inorganic particles.

The foamed polymeric support containing the plurality of inorganic particles can be disposed on a base. In certain embodiments, the base can include a polymer.

The membranes described herein can have an average thickness of from about 50 microns to about 1000 microns, for example, from about 100 microns to about 500 microns.

Methods of making the membranes described herein are also disclosed. The method can include (a) providing a material comprising a polymer and a plurality of inorganic particles, and (b) processing the material to form a foamed polymer. In certain embodiments, the method of making the membrane can include solvent casting. For example, step (a) providing a material can include (i) mixing the polymer and the plurality of inorganic particles with a solvent to form a mixture, and (ii) casting the mixture to form the material comprising a polymer and a plurality of inorganic particles. In some embodiments, the method can include heating the mixture during casting. The mixture can be heated to a temperature of at least about 60° C., such as about 120° C. or about 150° C. In some embodiments, step (b) processing the material can include allowing the solvent to evaporate to form the foamed membrane.

In certain embodiments, methods of making the membranes can include solid state foaming. For example, step (a) providing a material can include contacting the polymer with the plurality of inorganic particles and a non-solvent to form a mixture.

In other embodiments, the method of making the membrane can include extrusion. For example, step (a) can include (i) mixing polymer particles and the plurality of inorganic particles to form a blend, and (ii) extruding the blend to form the material comprising the polymer and plurality of inorganic particles. In some embodiments, the polymer particles and the inorganic particles can be mixed using a mechanical mixer to form the blend. In some embodiments, the blend can be extruded with a plastic extruder such as a twin-screw extruder to form the material comprising the polymer and a plurality of inorganic particles.

Step (b) processing the material can include (i) contacting the material with a gas to form a gas saturated material, and (ii) heating the gas saturated material to form the foamed polymer membrane. In some examples, the gas can include carbon dioxide. The pressure of the gas can be 10 MPa or less. The gas saturated material can be heated to a temperature of at least about 160° C., depending on the polymer used.

Methods of using the membranes described herein are also provided. In certain embodiments, the membrane can be used in humidifiers or fuel cell systems. In some aspects, the membrane can be used for separating a fluid mixture comprising water. The method of using the membrane can include contacting the membrane with a fluid mixture under conditions effective to afford transmembrane permeation of the water. In some embodiments, the membrane can be selectively permeable to water. In certain embodiments, the membrane can have a water vapor transmission rate of at least about $0.5 \times 10^{-5}$ mol·s$^{-1}$ m$^{-2}$ at 30° C., such as at least about $1.0 \times 10^{-5}$ mol·s$^{-1}$ m$^{-2}$, or at least about $1.5 \times 10^{-5}$ mol·s$^{-1}$ m$^{-2}$. In certain embodiments, the membrane can have a water vapor transmission rate of from about $0.5 \times 10^{-5}$ mol·s$^{-1}$ m$^{-2}$ to about $5 \times 10^{-5}$ mol·s$^{-1}$ m$^{-2}$ at 30° C. In certain embodiments, the membrane can have a $N_2$ permeance of less than about 1 standard cubic centimeter per minute at 15 psi and 21° C., or less than about 0.1 standard cubic centimeter per minute at 5 psi and 21° C.

BRIEF DESCRIPTION OF THE DRAWINGS

The accompanying drawings, which are incorporated in and constitute a part of this specification, illustrate several embodiments of this disclosure and together with the description, serve to explain the principles described herein.

DETAILED DESCRIPTION

Membranes and methods of making and using the membranes are described herein. The membranes can include a foamed polymeric support and a plurality of inorganic particles disposed within the foamed polymeric support. In some cases, the membrane can optionally include one or more sub-layers, for example, the membrane can include one or more foamed polymeric support layers. In some cases, the membrane can further comprise one or more additional layers, such as a base layer.

As used herein, "foam" or "foamed" refer to a polymeric material having a cellular structure, where the cells can be open (reticulated) and/or closed. The properties of the foam (e.g., density, modulus, tensile strength, tear strength, and so forth) can be adjusted by varying the components of the reactive compositions as is known in the art. The foam can have densities of 65 pounds per cubic foot (pcf) or less, for example 55 pcf or less, 50 pcf or less, 45 pcf or less, 40 pcf or less, 35 pcf or less, 30 pcf or less, 25 pcf or less, 20 pcf or less, or 15 pcf or less. The foam can have a void volume content of 20 to 99%, such as from 30 to 80%, based upon the total volume of the polymeric foam.

The foamed polymeric support can be a cellular layer that comprises a plurality of connected cells, disconnected cells, or combinations thereof. In some examples, the cells can be substantially connected. In some examples, the cells can be substantially disconnected. In some examples, the foamed polymeric support can comprise a combination of connected and disconnected cells. "Connected cells," also referred to herein as "open cells," refer to cells that are joined/connected with each other, and substantially extend from a surface of the support layer to an inner portion of the support layer. "Disconnected cells," also referred to herein as "closed cells," refer to cells comprising a membrane surrounding a cavity that is intact and not perforated. The percentage of closed cells may be determined using a gas pycnometer either by the method of ASTM D6226-10 (Standard test method for open cell content of rigid cellular plastics) or ISO 4590:2002 (Rigid cellular plastics—Determination of the volume percentage of open cells and of closed cells.)

In certain embodiments, the foamed polymeric support can have a foamed cell density of at least about $10^8$ cells/cm$^3$. For example, the foamed polymeric support can have a foamed cell density of about $10^8$ cells/cm$^3$ to about $10^{13}$ cells/cm$^3$ such as about $10^9$ cells/cm$^3$ to about $10^{13}$ cells/cm$^3$ or about $10^9$ cells/cm$^3$ to about $10^{12}$ cells/cm$^3$.

The foamed polymeric support can comprise cells with an average diameter of about 100 microns or less. For example, the foamed polymeric support can comprise cells with an average diameter of from about 0.1 micron to about 100 microns, from about 0.3 micron to about 100 microns, or from about 1 micron to about 100 microns (e.g., 95 microns or less, 90 microns or less, 80 microns or less, 75 microns or less, 65 microns or less, 50 microns or less, 40 microns or less, 30 microns or less, or 25 microns or less). In certain embodiments, the cells can have an average diameter of from about 10 microns to about 100 microns, about 20 microns to about 100 microns, about 30 microns to about 100 microns, about 40 microns to about 100 microns, or about 50 microns to about 100 microns). For example, the cells can have an average diameter of about 100 microns.

The foamed polymeric support can be formed from any suitable material. The material used to form the foamed polymeric support can be chosen based on the end use application of the membrane. In some embodiments, the foamed polymeric support can comprise a water permeable polymer. The polymer can be a natural or synthetic polymer. The polymer can be a homopolymer or a copolymer comprising two or more monomers. The copolymer can be random, block, or comprise a combination of random and block sequences. The polymer can in some embodiments be linear polymers, branched polymers, or hyperbranched/dendritic polymers. The polymer can also be present as a cross-linked polymer, a phase separated polymer, a porous condensed polymer, or a blend thereof.

In some embodiments, the foamed polymeric support can be derived from a hydrophilic polymer. As used herein, the term "hydrophilic polymer" refers to a polymer having an affinity for water and can readily absorb or be dissolved in water. The hydrophilic polymers generally include chains of chemical compounds that have polar or charged functional groups. Some characteristics of hydrophilic polymer surfaces include low contact angle, good wettability, and high solid surface free energy. In some embodiments, the polymer in the polymeric support can exhibit a water contact angle of less than about 90°. For example, the contact angle of the polymer can be about 85° or less, about 80° or less, about 75° or less, about 70° or less, about 65° or less, about 60° or less, or about 50° or less.

In some cases, the hydrophilic polymer can be a selective polymer through which water permeates via diffusion or facilitated diffusion. In some embodiments, the hydrophilic polymer can comprise a selective polymer having a water permeability of $1\times10^{-6}$ cm$^2$/s at 35° C. or greater. For example, the hydrophilic polymer can comprise a selective polymer having a water permeability of $5\times10^{-7}$ cm$^2$/s or greater, $1\times10^{-6}$ cm$^2$/s or greater, $5\times10^{-6}$ cm$^2$/s or greater, $1\times10^{-5}$ cm$^2$/s or greater, $2\times10^{-5}$ cm$^2$/s or greater, or $5\times10^{-5}$ cm$^2$/s or greater, at 35° C. or greater. In certain embodiments, the hydrophilic polymer can have a water permeability ranging from any of the minimum values described above to any of the maximum values described above. For example, the hydrophilic polymer can have a water permeability from $1\times10^{-7}$ cm$^2$/s to $1\times10^{-4}$ cm$^2$/s or from $1\times10^{-6}$ cm$^2$/s to $1\times10^{-5}$ cm$^2$/s at 35° C. The water permeability of the hydrophilic polymer can be measured using standard methods for measuring water permeability known in the art.

In some embodiments, the hydrophilic polymer can comprise a selective polymer having a water vapor to nitrogen selectivity of at least 1,000 at 30° C. In some embodiments, the polymer can have a H$_2$O:N$_2$ selectivity of at least 2,500, at least 4,000, at least 5,000, at least 6,000, at least 7,000, at least 8,000, at least 9,000, at least 10,000, or at least 11,000 at 30° C. In certain embodiments, the polymer can have a H$_2$O:N$_2$ selectivity ranging from any of the minimum values described above to any of the maximum values described above. For example, the polymer can have a H$_2$O:N$_2$ selectivity of from 1,000 to 100,000 or from 5,000 to 35,000 at 30° C. The H$_2$O:N$_2$ selectivity of the hydrophilic polymer can be measured using standard methods for measuring gas permeance known in the art. In some embodiments, the water vapor to nitrogen selectivity are determined at 30° C. extrapolated to a water vapor activity 0.

The polymer in the foamed polymeric support can have a theoretical glass-transition temperature ($T_g$) and/or a $T_g$ as measured by differential scanning calorimetry (DSC) using the mid-point temperature using the method described, for example, in ASTM 3418/82, of at least 90° C., such as at least 100° C., at least 105° C., at least 110° C., at least 120° C., at least 125° C., at least 130° C., at least 135° C., at least 140° C., at least 150° C., at least 160° C., at least 170° C., at least 180° C., at least 190° C., or at least 200° C. The polymer can have a theoretical $T_g$ and/or a $T_g$ as measured by DSC using the mid-point temperature of 300° C. or less, such as 250° C. or less, 220° C. or less, or 200° C. or less. The polymer can have a theoretical $T_g$ and/or a $T_g$ as measured by DSC using the mid-point temperature ranging from any of the minimum values described above to any of the maximum values described above. For example, the polymer can have a theoretical $T_g$ and/or a $T_g$ as measured by DSC using the mid-point temperature using the method described, for example, in ASTM 3418/82, of from 90° C. to 200° C., such as from 90° C. to 190° C., from 90° C. to 180° C., from 100° C. to 190° C., or from 120° C. to 180° C.

The polymer in the foamed polymeric support can have a melting point as measured by differential scanning calorimetry (DSC) or an equivalent technique, for example as determined by ASTM D3418 (2015), of at least 180° C., such as at least 190° C., at least 200° C., at least 210° C., at least 220° C., at least 230° C., at least 230° C., at least 240° C., at least 250° C., at least 280° C., at least 285° C., at least 300° C., at least 350° C., or at least 380° C. The polymer can have a melting point as measured by DSC or an equivalent technique of 380° C. or less, such as 350° C. or less, 320° C. or less, 300° C. or less, 280° C. or less, or 250° C. or less. The polymer can have a melting point as measured by differential scanning calorimetry (DSC) or an equivalent technique ranging from any of the minimum values described above to any of the maximum values described above. For example, the polymer can have a melting point as measured by differential scanning calorimetry (DSC) or an equivalent technique, for example as determined by ASTM D3418, of from 200° C. to 300° C., such as from 200° C. to 280° C., from 200° C. to 260° C., or from 200° C. to 250° C.

The polymer in the foamed polymeric support can exhibit high temperature stability. In particular, the polymer can possess sufficient chemical and dimensional stability to allow fabrication and to function in their intended environments. For example, the polymer can maintain physical and dimensional stability at high temperatures, such as at least 80° C., at least 90° C., at least 100° C., at least 110° C., at least 120° C., at least 130° C., at least 140° C., or at least 150° C. In some embodiments, the polymer can maintain integrity at temperatures of from about 80° C. to about 200° C. The polymer, or at least a portion of the polymer material, can maintain its integrity in oxidizing, reducing, acidic, and alkaline environments. In some embodiments, the polymer can also have negligible electronic conductivity.

The polymer in the foamed polymeric support can have a weight average molecular weight of about 10,000 Da or greater. For example, the polymer can have a weight average molecular weight of from about 25,000 Da or greater, about 50,000 Da or greater, about 75,000 Da or greater, or about 100,000 Da or greater. In some embodiments, the polymer can have a weight average molecular weight of about 10,000 Da to about 100,000 Da, such as about 10,000 Da to about 80,000 Da, about 10,000 Da to about 75,000 Da, about 10,000 Da to about 50,000 Da, or about 20,000 Da to about 75,000 Da.

The polymer can have a number average molecular weight of about 10,000 Da or greater. For example, the polymer can have a number average molecular weight of about 25,000 Da or greater, about 50,000 Da or greater, about 75,000 Da or greater, about or 100,000 Da or greater. In some embodiments, the polymer can have a number average molecular weight of about 10,000 Da to about 100,000 Da, such as about 10,000 Da to about 800,000 Da, about 10,000 Da to about 75,000 Da, about 10,000 Da to about 50,000 Da, or about 20,000 Da to about 75,000 Da.

Examples of polymers suitable for use in the foamed polymeric support can include polyamides, polyamideimides, polycarbonates, polyetherimides, polyesters, polyetherketone, polyimides, polymeric organosilicones, polypyrrolones, fluorinated polymers, sulfone-based polymers, polyurethane, polyvinylacetates, polyvinylalcohol, polyvinylpyrrolidones, polypyrrolones, derivatives thereof, copolymers thereof, or blends thereof. Specific examples of polymers in the foamed polymeric support can include polyethersulfone, polyphenylsulfone, polysulfone, partially fluorinated or perfluorinated derivatives thereof, copolymers thereof, or blends thereof. In some embodiments, the foamed polymeric support can include a sulfone-based polymer. In some embodiments, the foamed polymeric support can include polyethersulfone. In some examples, the polymer used in the foamed polymeric support is free or substantially free of fluorine.

The foamed polymeric support can comprise any suitable amount of the polymer. For example, in some cases, the foamed polymeric support can comprise from 10% to 100% by weight polymer, based on the total weight of the components used to form the foamed polymeric support. The membrane can comprise any suitable amount of the polymer. For example, in some cases, the membrane can comprise from 10% to 90% or from 10% to 50% by weight polymer, based on the total weight of the components used to form the foamed polymeric support.

The membrane can include an inorganic material disposed within the foamed polymeric support. The inorganic material can be continuous or discontinuous within the foamed polymeric support. "Continuous," as used herein, refers to a phase such that all points within the phase are directly connected, so that for any two points within a continuous phase, there exists a path which connects the two points without leaving the phase. A "phase" in this context can refer to, for example, a network of the inorganic material disposed within the gas permeable support.

The inorganic material can include a variety of suitable materials. In certain embodiments, the inorganic material can be selected to have a surface chemistry that is compatible with the foamed polymeric support. For example, in certain cases, the inorganic material can comprise a hydrophilic material. In some embodiments, the inorganic material can contain a plurality of particles. In some embodiments, the plurality of particles in the inorganic material can comprise a blend of particles having different shapes or sizes. In certain embodiments, the plurality of particles in the inorganic material can comprise a plurality of nanoparticles (including spherical nanoparticles, nanotubes, or a combination thereof).

The plurality of particles can have an average particle size of about 5 microns or less, such as about 4.5 microns or less, about 4 microns or less, about 3.5 microns or less, about 3 microns or less, about 2.5 microns or less, about 2 microns or less, about 1.5 microns or less, about 1 micron or less, about 750 nm or less, about 500 nm or less, about 400 nm or less, about 300 nm or less, about 200 nm or less, or about 100 nm or less. In some embodiments, the plurality of particles can have an average particle size of from about 10 nm to about 5 microns, such as from about 50 nm to about 5 microns, from about 50 nm to about 4 microns, from about 50 nm to about 3.5 microns, from about 50 nm to about 3 microns, from about 50 nm to about 2.5 microns, from about 50 nm to about 2 microns, from about 50 nm to about 1 micron, from about 100 nm to about 2 microns, or from about 100 nm to about 1 micron). The particle size of the plurality of particles can be determined according to ASTM B822-10 or ASTM D4438-85 (2007).

Examples of suitable inorganic materials include alkaline earth metal oxides, transition metal oxides, lanthanide metal oxides, group IVA metal oxides, transition metals, transition-metal catalysts, transition metals adsorbed on a non-reactive support, metal alloys, silicates, alumino-silicates, clays, and combinations thereof. Specific examples of inorganic materials include alumina, silica, zeolite, titanic, zirconia, palladium, platinum, nickel, transition-metal catalysts, and combinations thereof. In certain embodiments, the inorganic material can be chosen from silicate, aluminosilicate, or combinations thereof. In certain embodiments, the inorganic material can comprise zeolite. The zeolite can comprise zeolites having varying frameworks and differing Si/Al ratios. For example, the inorganic material can be zeolite Y.

The inorganic particles can be present in any suitable amount. The amount of inorganic particles present in the foamed polymeric support can be at least 10 wt %, based on the total weight of the foamed polymeric support and the plurality of inorganic particles. For example, the inorganic particles can be present in an amount of greater than 10 wt %, at least 15 wt %, at least 20 wt %, at least 25 wt %, at least 26 wt %, at least 27 wt %, at least 28 wt %, at least 29 wt %, at least 30 wt %, at least 31 wt %, at least 32 wt %, at least 33 wt %, at least 34 wt %, at least 35 wt %, at least 40 wt %, at least 45 wt %, at least 50 wt %, at least 55 wt %, at least 60 wt %, at least 65 wt %, or at least 70 wt %, based on the total weight of the foamed polymeric support and the plurality of inorganic particles. In certain embodiments, the inorganic particles can be present in an amount of 80 wt % or less, 75 wt % or less, 70 wt % or less, 65 wt % or less, 60 wt % or less, 55 wt % or less, or 50 wt % or less, based on the total weight of the foamed polymeric support and the plurality of inorganic particles. In certain embodiments, the inorganic particles can be present in an amount of from greater than 10 wt % to 80 wt %, 15 wt % to 80 wt %, 20 wt % to 80 wt %, 20 wt % to 75 wt %, 10 wt % to 70 wt %, greater than 10 wt % to 70 wt %, 20 wt % to 70 wt %, 25 wt % to 80 wt %, 25 wt % to 70 wt %, 30 wt % to 80 wt %, or 30 wt % to 60 wt %, based on the total weight of the foamed polymeric support and the plurality of inorganic particles.

The plurality of inorganic particles in the foamed polymeric support can be monodisperse in size. The term "monodisperse," as used herein, describes a population of particles where all of the particles are the same or nearly the same size. As used herein, a monodisperse particle size distribution refers to particle distributions in which at least 80% of the distribution, such as at least 85% of the distribution, at least 90% of the distribution, or at least 95% of the distribution lies within 20% of the median particle size (e.g., within 15% of the median particle size, within 10% of the median particle size, or within 5% of the median particle size). In other examples, the foamed polymeric support can include particles of varying sized (e.g., a mixture of two or more populations of particles having different average particle sizes).

In certain embodiments, the foamed polymeric support can be disposed on a base. The base can be in any configuration configured to facilitate formation of a membrane suitable for use in a particular application. For example, the base can be a flat disk, a tube, a spiral wound, or a hollow fiber base. The base can be formed from any suitable material. For example, the base can contain a polymer. In some embodiments, the base can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric, for example, a non-woven fabric comprising fibers formed from a polyester. In certain embodiments, the base can be a water-permeable material, such as a mesh or porous solid.

In certain embodiments, the foamed polymeric support can be coated on a surface with a coating layer. The coating layer can be permeable to water and increase the mechanical strength and/or selectivity of the membrane, without significantly altering the permeability of the foamed polymeric support layer. The coating layer can comprise a polymer.

The membranes described herein can further comprise other components or additives depending on its use and are generally known to those skilled in the art.

The total thickness of the membrane, as well as the thickness of each layer/sub-layer making up the membrane, can be chosen such that the structure is mechanically robust, but not so thick as to impair permeability. In some cases, the membranes disclosed herein can have a thickness of from 50 microns to 1000 microns, such as from 50 microns to 750 microns, or from 100 microns to 500 microns, from 250 microns to 750 microns, from 250 microns to 500 microns, or from 300 microns to 500 microns). In some cases, the membranes can have a thickness of 1500 microns or less, such as 1250 microns or less, 1000 microns or less, 800 microns or less, 600 microns or less, 500 microns or less, 450 microns or less, 400 microns or less, 350 microns or less, 300 microns or less, or 250 microns or less.

In some embodiments, the foamed polymeric support layer can have a thickness of from 25 microns to 1000 microns, such as from 25 microns to 800 microns, from 50 microns to 750 microns, 50 microns to 500 microns, from 100 microns to 750 microns, 100 microns to 500 microns, 200 microns to 750 microns, from 200 microns to 500 microns, or from 250 microns to 500 microns. In some embodiments when the membrane includes a base layer, the base layer can have a thickness of from 50 microns to 250 microns, such as from 50 microns to 200 microns, or from 100 microns to 250 microns. In some embodiments when the membrane includes a coating layer, the coating layer can have a thickness of from 50 microns to 250 microns, such as from 50 microns to 200 microns, or from 100 microns to 250 microns.

Humidifiers including any one of the membranes described herein are also disclosed. The membrane performance can be compared with those of commercially available membranes such as Nafion membranes from DuPont and others for ultra-filtration and reverse osmosis. In the present disclosure, at least a portion of the membrane facing each plate in the humidification setup is water permeable, and gas impermeable in order to allow humidity exchange between liquid and gas streams flowing through the humidification area. In some embodiments, the water permeable membrane is impermeable to reactant gases, such as air. The membranes described herein are suitable and convenient for water permeable humidification to achieve desired humidified-air output.

Fuel cells including a humidifier as described herein are also disclosed. The fuel cell can be prepared using the membranes described herein and a bipolar plate in a manner known to one skilled in the art. The fuel cell can be a polymer electrolyte fuel cell or direct liquid fuel cell whose cathodic reaction is oxygen reduction. Particular examples of such direct liquid fuel cell include a direct methanol fuel cell, direct formic acid fuel cell, direct ethanol fuel cell, and/or direct dimethyl ether fuel cells.

Methods of Making Membranes

Methods of making the membranes described herein are also disclosed herein. The methods of making the membrane can include a) providing a material comprising a polymer and a plurality of inorganic particles and b) processing the material to form a foamed polymer. In some embodiments, the membranes can be formed by a method comprising solvent casting, extrusion, or solid state foaming.

The method for solvent casting can include forming a mixture of the polymer and the plurality of inorganic particles. The mixture can be a suspension comprising the polymer, plurality of inorganic particles, and a solvent. The solvent may be chosen such that the polymer dissolves in the solvent. In certain embodiments, the solvent can be an organic solvent. For example, the solvent can include acetone, aniline, dimethyl sulfoxide, benzene, dimethylformamide, methyl ethyl ketone, ethyl acetate, ethylene dichloride, toluene, or tetrahydrofuran. In certain embodiments, the solvent can be dimethylformamide. The method can include mixing the polymer with the solvent to form a polymer solution. Mixing can be carried out using any suitable technique known in the art, such as using a mixer with agitation provided by a high shear mixing blade. The plurality of inorganic particles can be simultaneously added with the polymer or added to the polymer solution to form a mixture. The mixture can include from about 1% to about 25% solids and about 75% to about 99% solvent. In some embodiments, the solid to solvent ratio can be from about 0.01:1 to about 0.2:1.

The method for solvent casting can further include casting the mixture of inorganic particles and polymer. The mixture can be casted into a mold with any desired geometry. In some embodiments, the method includes heating the mixture during casting. For example, the mixture can be heated to a temperature of 30° C. or greater, such as 40° C. or greater, 50° C. or greater, or 60° C. or greater. Without wishing to be bound by theory, heating the mixture during casting can remove or prevent water from being incorporated into the polymer. The method can further include processing the mixture comprising the polymer and plurality of inorganic particles to form a foamed polymer. Processing the mixture can include allowing the solvent to evaporate.

As described herein, the membrane can be formed by solid state foaming. The method for solid state foaming can include forming a mixture of the polymer and the plurality of inorganic particles in a non-solvent. The polymer in the mixture can be in the form of a disc or sheet. Any suitable non-solvent can be used. "Non-solvent" as used herein refers to a solvent or mixture of solvents in which the polymer and inorganic particles are insoluble or poorly soluble. In certain embodiments, the non-solvent can include glycerol, water, or a combinations thereof.

In certain embodiments, the method of making the membrane can include extrusion. For example, the method can include (i) mixing polymer particles, such as a polymer powder and the plurality of inorganic particles to form a blend, and (ii) extruding the blend to form the material comprising the polymer and plurality of inorganic particles. In some embodiments, the polymer particles and the inorganic particles can be mixed using a mechanical mixer to form the blend. In some embodiments, the blend can be extruded with a plastic extruder such as a twin-screw extruder to form the material comprising the polymer and a plurality of inorganic particles.

The material comprising the polymer and inorganic particles can be processed by saturating the material with a pressurized gas. Any suitable gas, such as carbon dioxide or nitrogen can be used. The gas saturation of the material can be carried out over a fixed duration so that the gas achieves an equilibrium concentration in the system. The pressure of the gas can be about 10 MPa or less, such as about 9.5 MPa or less, about 9 MPa or less, about 8.5 MPa or less, about 8 MPa or less, about 7.5 MPa or less, about 7 MPa or less, or about 6.5 MPa or less.

The method can further include nucleating bubbles (foaming) in the gas saturated material by introducing a thermodynamic instability. The thermodynamic instability can be achieved by introducing a sudden increase in temperature or a sudden decrease in pressure. Without wishing to be bound by theory, the glass transition temperature (Tg) of polymer in the saturated polymer system reduces due to the dissolved gas. The resulting thermodynamic instability can reduce the solubility of the gas in the polymer, which leads to the gas being driven out of the system and causing nucleated bubbles. In certain embodiments, the bubbles can be nucleated by increasing the temperature of the gas saturated system to the reduced Tg. For example, the saturated sample can be foamed by increasing the temperature of the mixture or placing the sample between two plates heated to the desired temperature.

In certain embodiments, the gas saturated material can be heated to a temperature of at least about 60° C., at least about 70° C., at least about 80° C., at least about 90° C., at least about 100° C., at least about 110° C., at least about 120° C., at least about 125° C., at least about 130° C., at least about 135° C., at least about 140° C., at least about 150° C., or at least about 160° C. In certain embodiments, the gas saturated material can be heated to a temperature of from about 60° C. to about 250° C., such as from about 80° C. to about 250° C., from about 100° C. to about 250° C., from about 120° C. to about 250° C., or from about 150° C. to about 250° C.

Methods of Using

The membranes disclosed herein can be used for separating a fluid mixture comprising a first fluid and a second fluid. For example, the membranes can be used to separate water from a fluid mixture. Methods of using the membrane can include contacting the membrane with the fluid mixture under conditions effective to afford transmembrane permeation of the water. In some embodiments, the method can also include withdrawing from the reverse side of the membrane a permeant containing water, wherein the water is selectively removed from the fluid stream. The permeant can comprise water in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 70° C. or greater. For example, the membrane can be used at temperatures of from 70° C. to 180° C. In some embodiments, the membrane can be used at temperatures of less than 150° C.

The fluid mixture can include water and a mixture of gases. For example, the fluid mixture can include nitrogen, oxygen, ozone, carbon monoxide, carbon dioxide, nitrogen oxides, sulfur oxides, hydrogen sulfide, hydrogen chloride, hydrogen, most hydrocarbons, or combinations thereof. In some embodiments, the membrane can be selective to water versus hydrogen, nitrogen, carbon dioxide, or combinations thereof. In some embodiments, the water may be derived from a source that requires purification for fuel cells, electricity generation, and hydrogenation applications.

The membranes described herein can be selective to water compared to, for example, compounds of environmental interest such as nitrogen, oxygen, ozone, carbon monoxide, carbon dioxide, nitrogen oxides, sulfur oxides, hydrogen sulfide, hydrogen chloride, hydrogen, and most hydrocarbons. In some embodiments, the membranes can be selective to water compared to nitrogen. For example, the membranes described herein can have a water permeability of $1 \times 10^{-6}$ cm$^2$/s or greater at 35° C. In some embodiments, the membranes can have a water permeability of $1 \times 10^{-6}$ cm$^2$/s or greater, $2 \times 10^{-6}$ cm$^2$/s or greater, $5 \times 10^{-6}$ cm$^2$/s or greater, $7 \times 10^{-6}$ cm$^2$/s or greater, $1 \times 10^{-5}$ cm$^2$/s or greater, $2 \times 10^{-5}$ cm$^2$/s or greater, or $5 \times 10^{-5}$ cm$^2$/s or greater at 35° C.

In some embodiments, the membranes described herein can have a water vapor transmission rate of at least $0.5 \times 10^{-5}$ mol·m$^{-2}$·s$^{-1}$ at 30° C., as determined by ASTM E398. In some embodiments, the membranes described herein can have a water vapor transmission rate of about $1.0 \times 10^{-5}$ mol·m$^{-2}$·s$^{-1}$ or greater, about $1.1 \times 10^{-5}$ mol·m$^{-2}$·s$^{-1}$ or greater, about $1.2 \times 10^{-5}$ mol·m$^{-2}$·s$^{-1}$ or greater, about $1.3 \times 10^{-5}$ mol·m$^{-2}$·s$^{-1}$ or greater, about $1.4 \times 10^{-5}$ mol·m$^{-2}$·s$^{-1}$ or greater, about $1.5 \times 10^{-5}$ mol·m$^{-2}$·s$^{-1}$ or greater, about $1.6 \times 10^{-5}$ mol·m$^{-2}$·s$^{-1}$ or greater, about $1.7 \times 10^{-5}$ mol·m$^{-2}$·s$^{-1}$ or greater, about $2 \times 10^{-5}$ mol·m$^{-2}$·s$^{-1}$ or greater, about $3 \times 10^{-5}$ mol·m$^{-2}$·s$^{-1}$ or greater, about $4 \times 10^{-5}$ mol·m$^{-2}$·s$^{-1}$ or greater, or about $5 \times 10^{-5}$ mol·m$^{-2}$·s$^{-1}$ or greater, at 30° C. as determined by ASTM E398. In some embodiments, the membranes described herein can have a water vapor transmission rate of from about $0.5 \times 10^{-5}$ to about $5 \times 10^{-5}$ mol·m$^{-2}$·s$^{-1}$, from about $0.7 \times 10^{-5}$ to about $5 \times 10^{-5}$ mol·m$^{-2}$·s$^{-1}$, from about $1\times10^{-5}$ to about $5\times10^{-5}$ mol·m$^{-2}$·s$^{-1}$, from about $0.5\times10^{-5}$ to about $4\times10^{-5}$ mol·m$^{-2}$·s$^{-1}$, from about $0.5\times10^{-5}$ to about $3\times10^{-5}$ mol·m$^{-2}$·s$^{-1}$, from about $1.0\times10^{-5}$ to about $5\times10^{-5}$ mol·m$^{-2}$·s$^{-1}$, from about $1.0\times10^{-5}$ to about $4\times10^{-5}$ mol·m$^{-2}$·s$^{-1}$, or from about $1.0\times10^{-5}$ to about $3\times10^{-5}$ mol·m$^{-2}$·s$^{-1}$, at 30° C. as determined by ASTM E398. The method for determining the water vapor transmission rate can include no pressure gradient with liquid water present on the feed side of the membrane and 0% RH on the permeate side.

In some embodiments, the membranes described herein can have a $N_2$ permeance of less than 1 standard cubic centimeter per minute at 15 psi at 21° C. For example, the membranes can have a $N_2$ permeance of less than 0.9, less than 0.8, less than 0.7, less than 0.6, less than 0.5, less than 0.4, less than 0.3, less than 0.2, or less than 0.1 standard cubic centimeter per minute at 15 psi at 21° C. In some embodiments, the membranes described herein can have a $N_2$ permeance of less than 0.1 standard cubic centimeter per minute at 5 psi at 21° C. The foaming time of the membranes can vary, such as for 3 seconds or less, 2 seconds or less, or 1 second or less. In some embodiments, the membranes described herein can have a $N_2$ permeance of less than 1 standard cubic centimeter per minute at 15 psi at 21° C., when foamed for less than 3 seconds, such as 1 second. The $N_2$ permeance can be determined using the constant-volume variable-pressure method as described on pages 379-380 of the Springer Handbook of Materials Measurement Methods (Wiederhorn, S. et al., 2006, "Mechanical Properties," Springer Handbook of Materials Measurement Methods, H. Czichos, T. Saito, and L. Smith, eds., Springer Science+Business Media, Inc., Wurzburg, pp. 371-396).

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Preparation of PES-Zeolite Membranes.

PES-zeolite films were prepared at two zeolite weight loadings and a variety of casting conditions. PES pellets from Veradel were dissolved in DMF at 10% PES by weight and stirred for 12 hours at room temperature. The PES weight loading in solvent was kept low to provide a decrease in the solution viscosity. Zeolite was either pre-dried in a vacuum oven overnight at 190° C. or added directly from a container stored in ambient conditions. Zeolite was then added to the polymer solution and magnetically stirred for 10 minutes to aid dispersion, followed by 60 minutes of sonication to break up zeolite aggregations and further disperse the particles in the solution.

Figure 1:
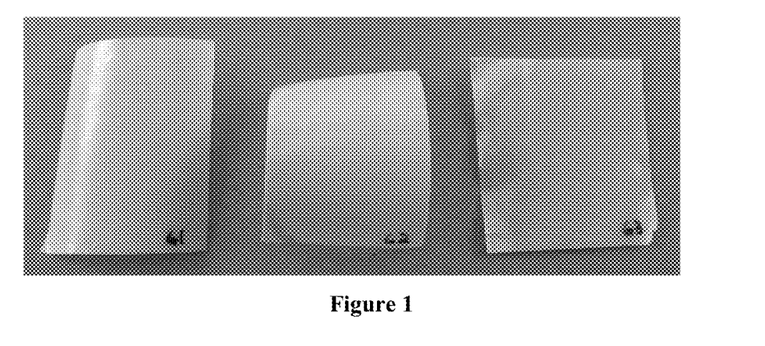
FIG. 1 is a picture showing three samples produced with 30% zeolite and cast in a rigid PTFE container.

A vacuum was applied with a manual vacuum pump to the solution for five minutes during final stirring after sonication. The vacuum system was fitted with an overflow cup to prevent solvent from entering the pump. After sonication and vacuum application, films were cast on to either a flexible Teflon film or a rigid Teflon container. The film/container were pre-heated to 60° C. and then the solution was poured into the container and covered with a perforated sheet of aluminum foil to control the solvent evaporation rate. The solution was left overnight to allow for complete solvent evaporation. FIG. 1 shows three samples produced with 30% zeolite and cast in a rigid PTFE container. The films were then rinsed in DI water and stored until foaming.

Figure 2:
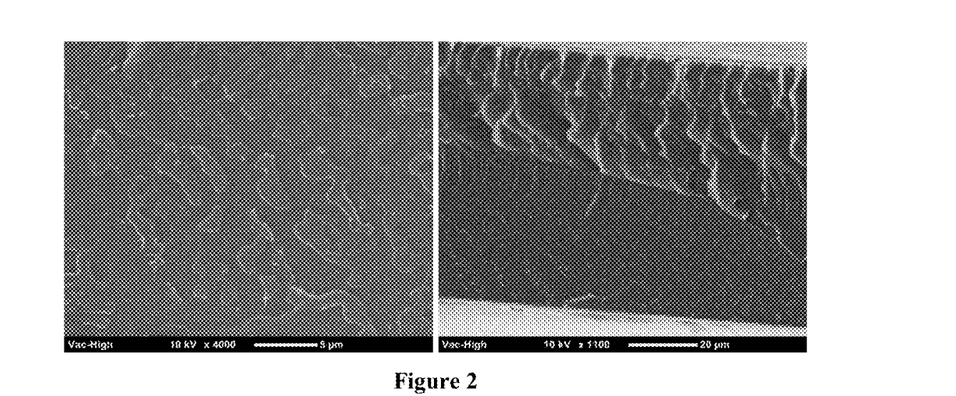
FIG. 2 shows a scanning electron microscopy image of a foamed membrane derived from PES.
Figure 3:
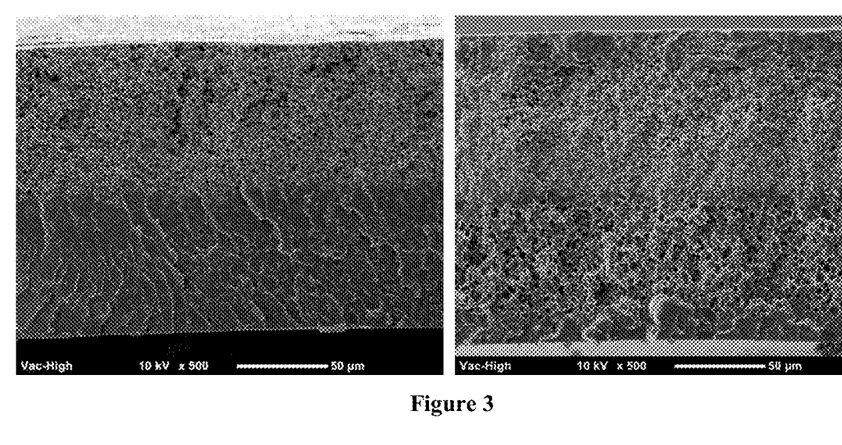
FIG. 3 shows scanning electron microscopy images of an unfoamed membrane (left) and a foamed membrane (right) derived from PES and 50% zeolite by weight of the PES and zeolite composition.

Foaming was carried out using the solid state foaming process. Films were saturated with $CO_2$ in a pressure vessel at 9 MPa for 72 hours. The saturation temperature was maintained at room temperature. The foaming temperature was held at ~190° C. Foaming was carried out until the rate of $CO_2$ escape from the polymer greatly slowed, which usually took ~3 seconds. The shorter duration was usually ~1 second, which provides a more completely foamed sample. As a baseline comparison, FIG. 2 shows the scanning electron microscopy (SEM) images of a virgin PES film sample. There was no Zeolite loaded in this film sample. FIG. 3 shows SEM images of a 50% zeolite film sample before and after foaming. The upper half of the film with zeolite does not appear greatly altered, but the lower section is porous after foaming.

Foamed and unfoamed films were compared to one another for relative water transport performance. This procedure is consistent with the ASTM standard for accumulation type membrane permeation systems [1]. Each film was measured in the system twice and then the two performance curves were averaged. A virgin PES film was prepared according to the film casting procedure established earlier and tested in the permeation system, then plotted as a baseline/control. Nafion was also tested in the system to establish a performance target for the membranes.

Figure 4:
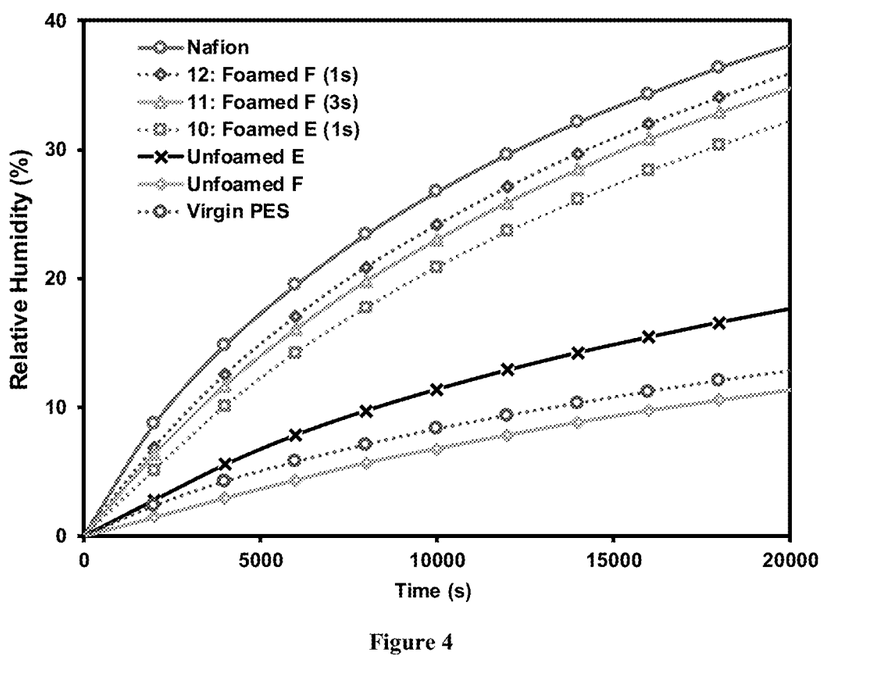
FIG. 4 is a plot showing the performance of Nafion, foamed PES-membranes, and unfoamed PES-membranes over time.

Permeation performance results can be seen in FIG. 4. The performance curves indicate that foaming enhances permeation performance compared to unfoamed samples. The three foamed samples shown in the figure lie close to one another on the plot just under the Nafion sample. Sample 12, a high performing foamed sample, achieved ~95% of the final humidity value obtained by Nafion. The only difference between samples 11 and 12 was foaming duration. It is believed that longer foaming duration results in decreased porosity, so a slightly lower permeability was expected. The proximity of the two lines indicates foaming duration effects are far less pronounced than the effects of foaming in general. Unfoamed samples E and F achieved much lower permeation rates than the foamed films and are grouped near the virgin PES film, which represents the baseline measurement value for an impermeable membrane.

Figure 5:
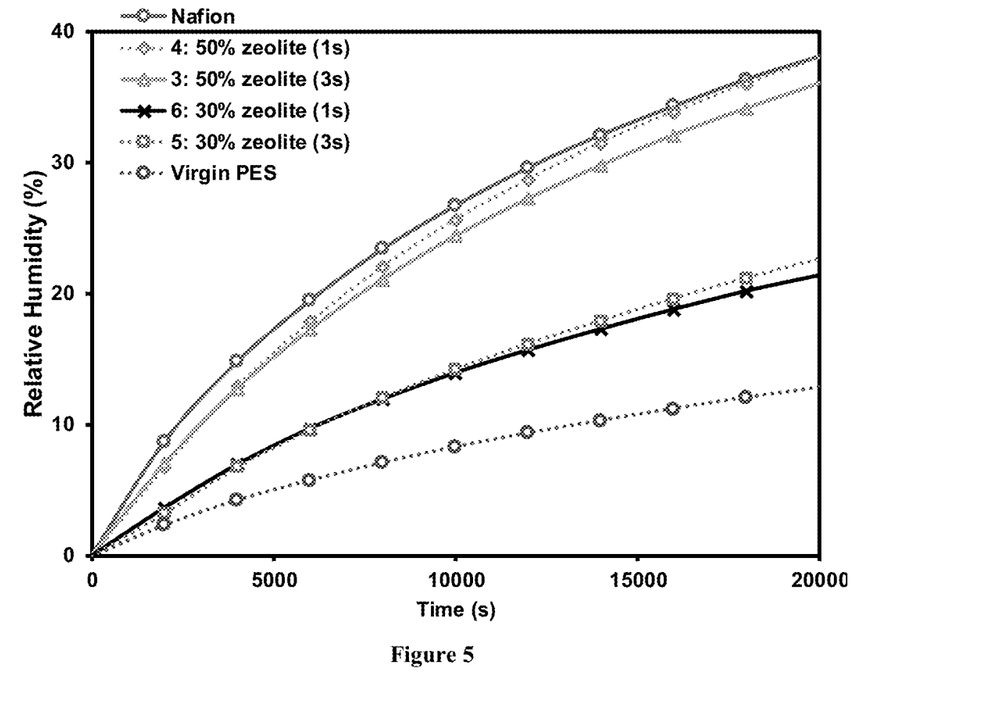
FIG. 5 is a plot showing the performance of Nafion, foamed PES-membranes, and unfoamed PES-membranes by zeolite loading over time.

The effect of zeolite weight loading on foamed membrane permeation performance was examined by comparing foamed samples from membrane B (50% zeolite loading) to foamed samples from membrane C (30% zeolite loading). These membranes were prepared identically with the exception of their zeolite loading. FIG. 5 shows the results of the permeation rate tests for these materials. The plot indicates that increased zeolite loading enhances water transport on the same order of magnitude as foaming. The 50% zeolite samples achieved a system relative humidity nearly double that of the 30% zeolite samples, with sample 4 overlapping Nafion in performance near the end. Again, the close proximity of samples foamed under the same conditions for different durations indicates foaming duration has little effect on permeability compared the weight loading.

Figure 6:
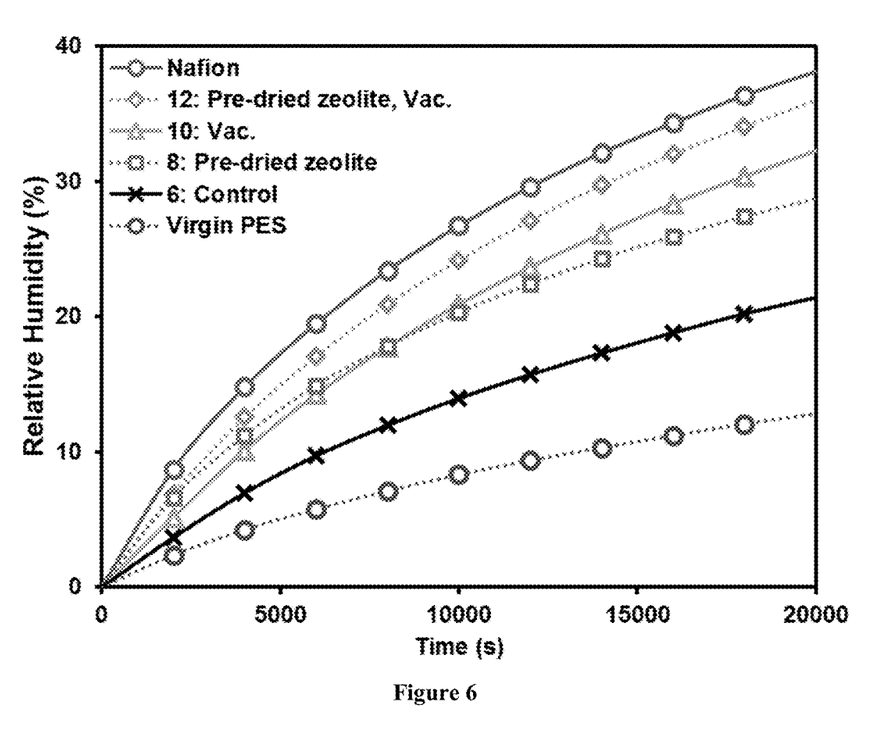
FIG. 6 is a plot showing the test results of 30% zeolite films with varying application of pre-dried zeolite and applied vacuum.

The casting conditions (applied vacuum and pre-dried zeolite) were tested for their effect on water permeation performance. FIG. 6 shows the test results of 30% zeolite films prepared with identical foaming conditions but varying application of pre-dried zeolite and applied vacuum. Only the short duration foaming results were included here (1 s), but the same trend can be seen in the longer duration foams. The control case, foam 6, exhibited a lower permeation rate. Both pre-dried zeolite and applied vacuum individually increase permeation performance. Sample 12 had both of these conditions applied and obtained the highest permeation performance. These results support the decision to make pre-dried zeolite and applied vacuum part of standard film preparation procedure in order to increase homogeneity between films as well as film quality.

Three foamed samples were tested for $N_2$ permeability: Samples 4, 5, and 8. The samples were prepared according to standard testing procedure for gas separation membranes and were tested at three different upstream pressures. A detailed description of the fixed-volume variable-pressure gas permeation system used is available in the Springer Handbook of Materials Measurements and Methods. Foamed samples were fixed to washer-shaped brass shims with two part epoxy, taking care to apply evenly and create a complete seal. Samples 4 and 8 had permeability values on the same order of magnitude, which averaged around 6,100 barrer at 5 psi pressure differential, 6,500 barrer at 15 psi, and 7,500 barrer at 30 psi. The permeability values of sample 5 were an order of magnitude higher than the other two films. The measured permeability values were 70,000 barrer at 5 psi, 73,000 barrer at 15 psi, and 78,000 at 30 psi.

The foamed samples were also tested for water vapor transmission rate (WVTR) as detailed in ASTM E398. A 50% zeolite loading sample exhibited a WVTR of $1.6 \times 10^{-5}$ $mol \cdot s^{-1}$ $m^{-2}$. A 30% zeolite loading sample exhibited a WVTR of $1.47 \times 10^{-5}$ $mol \cdot s^{-1}$ $m^{-2}$. The Department of Energy (DOE) membrane testing protocols define acceptable gas crossover in terms of standard cubic centimeters per minute of air (SCCM) [2, 3]. The above permeability values were converted to crossover flow rates. Permeability values for the 5 psi pressure difference were used because that is the maximum value specified in automotive fuel cell applications. Samples 4, 5 and 8 all pass the gas barrier requirement for humidification materials. Samples 4 and 8 both had a calculated crossover flow rate of less than 0.1 SCCM, far lower than the failure criteria of 10 SCCM set by the DOE membrane testing protocols [2, 3]. Sample 5 had a crossover leak rate of less than 1 SCCM, an order of magnitude lower than the requirement.

[1] A. International, "ASTM E398-13," in *Standard Test Method for Water Vapor Transmission Rate of Sheet Materials Using Dynamic Relative Humidity Measurement*, ed. West Conshohocken, Pa., 2013.

[2] T. G. Benjamin, "Membrane and MEA Accelerated Stress Test Protocols," presented at the U.S. Department of Energy Hydrogen and Fuel Cells Program 2007 Annual Merit Review and Peer Evaluation Meeting, Arlington, Va., 2007.

[3] U. F. C. T. Team, "Cell Component Accelerated Stress Test Protocols for PEM Fuel Cells," United States Department of Energy Website 2010.

It will be apparent to those skilled in the art that various modifications and variations can be made in the present disclosure without departing from the scope or spirit of the invention. Other embodiments of the disclosure will be apparent to those skilled in the art from consideration of the specification and practice of the methods disclosed herein. It is intended that the specification and examples be considered as exemplary only, with a true scope and spirit of the invention being indicated by the following claims.

What is claimed is:

1. A membrane comprising:
   a support comprising a foamed layer and an unfoamed layer, wherein the support is derived from a hydrophilic polymer and a plurality of inorganic particles, and
   wherein the unfoamed layer is integrally bonded to an outer surface of the foamed layer,
   wherein the hydrophilic polymer is one of polyethersulfone, polyphenylenesulfone, or polysulfone,
   wherein the plurality of inorganic particles are present in an amount from 30 wt % to 50 wt %, based on the total weight of the support, and the plurality of inorganic particles comprise zeolite,
   wherein the support is produced by solid state foaming, and
   wherein the membrane has an $N_2$ permeance of 1 sccm or less at a pressure differential of 5 psi.

2. The membrane of claim 1, wherein the polymer has a glass transition temperature of at least 90° C.

3. The membrane of claim 1, wherein the sulfone-based hydrophilic polymer is polyethersulfone.

4. The membrane of claim 1, wherein the plurality of inorganic particles have an average particle diameter of from about 100 nm to about 1 μm.

5. The membrane of claim 1, wherein the support comprises cells having an average diameter of about 100 microns or less.

6. The membrane of claim 1, wherein the membrane has an average thickness of from about 100 microns to about 500 microns.

7. The membrane of claim 1, wherein the membrane is selectively permeable to water.

8. The membrane of claim 1, wherein the membrane has a water vapor transmission rate of at least about $1.0 \times 10^{-5}$ $mol \cdot s^{-1}$ $m^{-2}$ at 30° C., as measured according to ASTM E398.

9. The membrane of claim 1, wherein the membrane has a $N_2$ permeance of less than 1 standard cubic centimeter per minute at 15 psi and 21° C.

10. The membrane of claim 1, wherein the membrane has a $N_2$ permeance of less than 0.1 standard cubic centimeter per minute at 5 psi and 21° C.

11. A humidifier comprising the membrane of claim 1.

12. A fuel cell comprising the humidifier of claim 11.

13. A method for separating a fluid mixture comprising water, the method comprising contacting the membrane of claim 1 with the fluid mixture under conditions effective to afford transmembrane permeation of the water.

14. A method of making a foamed polymer membrane of claim 1, comprising,
   (a) providing a material comprising a hydrophilic polymer and a plurality of inorganic particles,
   (b) processing the material by solid state foaming to form a foamed polymer membrane comprising a foamed layer and an unfoamed layer integrally bonded to an outer surface of the foamed layer,
   wherein the hydrophilic polymer is one of polyethersulfone, polyphenylenesulfone, or polysulfone, the plurality of inorganic particles are present in an amount from 30 wt % to 50 wt %, based on the total weight of the material, and the plurality of inorganic particles comprise zeolite, and
   wherein the membrane has an $N_2$ permeance of 1 sccm or less at a pressure differential of 5 psi.

15. The method of claim 14, wherein step (a) comprises
(i) mixing hydrophilic polymer particles and the plurality of inorganic particles to form a blend, and
(ii) extruding the blend to form the material comprising the hydrophilic polymer and plurality of inorganic particles.

16. The method of claim 14, wherein step (a) comprises
(i) mixing the hydrophilic polymer and the plurality of inorganic particles with a solvent to form a mixture, and
(ii) casting the mixture to form the material comprising the polymer and plurality of inorganic particles.

17. The method of claim 14, wherein step (b) comprises
(i) contacting the material with a gas to form a gas saturated material, and
(ii) heating the gas saturated material to form the foamed polymer membrane.

18. The method of claim 17, wherein the gas saturated material is heated to a temperature of at least about 160° C.

* * * * *